(12) United States Patent
Takase

(10) Patent No.: US 10,634,948 B2
(45) Date of Patent: Apr. 28, 2020

(54) LIGHTING DEVICE AND DISPLAY DEVICE

(71) Applicant: SHARP KABUSHIKI KAISHA, Sakai, Osaka (JP)

(72) Inventor: Kenji Takase, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/082,716

(22) PCT Filed: Mar. 6, 2017

(86) PCT No.: PCT/JP2017/008642
§ 371 (c)(1),
(2) Date: Sep. 6, 2018

(87) PCT Pub. No.: WO2017/154799
PCT Pub. Date: Sep. 14, 2017

(65) Prior Publication Data
US 2019/0101793 A1    Apr. 4, 2019

(30) Foreign Application Priority Data
Mar. 11, 2016    (JP) .................................. 2016-048550

(51) Int. Cl.
*G02F 1/1335* (2006.01)
*F21V 8/00* (2006.01)
*G02F 1/13357* (2006.01)

(52) U.S. Cl.
CPC ..... *G02F 1/133603* (2013.01); *G02B 6/0031* (2013.01); *G02F 1/133605* (2013.01); *G02F 1/133606* (2013.01); *G02F 1/133608* (2013.01); *G02F 1/133611* (2013.01);
(Continued)

(58) Field of Classification Search
CPC .. G02B 6/0028; G02B 6/0023; G02B 6/0031; G02B 6/0025; G02B 6/003
See application file for complete search history.

(56) References Cited

U.S. PATENT DOCUMENTS

2006/0114690 A1    6/2006  Iki et al.
2006/0256578 A1*  11/2006  Yang .................... G02B 6/0031
                                                              362/609
(Continued)

FOREIGN PATENT DOCUMENTS

JP    2003-281915 A    10/2003
JP    2004-158336 A     6/2004
(Continued)

*Primary Examiner* — Andrew J Coughlin
*Assistant Examiner* — Zachary J Snyder
(74) *Attorney, Agent, or Firm* — ScienBiziP, P.C.

(57) ABSTRACT

The present invention provides a lighting device that is excellent in luminance uniformity and light use efficiency and allows for a narrower frame, and a display device including the lighting device. Provided is a lighting device including: a light guide plate; a light source disposed posterior to the light guide plate; a reflection member including a reflective surface facing a light emitting surface of the light source and a light incident surface of the light guide plate, disposed lateral to the light guide plate and the light source, the lighting device further including a reflective polarizing layer on the light incident surface of the light guide plate.

4 Claims, 8 Drawing Sheets

(52) U.S. Cl.
CPC .. *G02F 1/133615* (2013.01); *G02F 1/133621* (2013.01); *G02B 6/0055* (2013.01); *G02B 6/0056* (2013.01)

(56) References Cited

U.S. PATENT DOCUMENTS

| | | | | |
|---|---|---|---|---|
| 2010/0182308 A1* | 7/2010 | Holman | ............... | G02B 6/0028 345/214 |
| 2010/0296268 A1* | 11/2010 | Fasham | ................ | G02B 6/0028 362/97.1 |
| 2012/0140519 A1* | 6/2012 | Sakai | ................... | G02B 6/0016 362/608 |
| 2013/0201721 A1* | 8/2013 | Tsai | ..................... | G02B 6/0036 362/609 |
| 2016/0170122 A1* | 6/2016 | Lee | ...................... | G02B 6/0016 362/609 |

FOREIGN PATENT DOCUMENTS

| | | |
|---|---|---|
| JP | 2005-135860 A | 5/2005 |
| JP | 2006-156039 A | 6/2006 |
| JP | 2007-207615 A | 8/2007 |
| JP | 2012-128958 A | 7/2012 |

\* cited by examiner (a)

(b)

LIGHTING DEVICE AND DISPLAY DEVICE

TECHNICAL FIELD

The present invention relates to lighting devices and display devices. The present invention more specifically relates to a lighting device suitable for use as a backlight in liquid crystal display devices, and a display device including the lighting device.

BACKGROUND ART

Liquid crystal display devices, a type of display device, often have a lighting device because a liquid crystal panel itself does not emit light. In this case, the liquid crystal panel controls the transmission amount of light emitted from the lighting device in accordance with input image signals. Widely known systems of the lighting device include a direct backlight system in which a light source is disposed directly beneath a liquid crystal panel and an edge-lit (side-lit) backlight system in which a light guide plate is disposed directly beneath a liquid crystal panel and a light source is disposed lateral to the light guide plate. The edge-lit backlight system is often employed for small- to middle-sized liquid crystal display devices.

In an exemplary main configuration of a conventional edge-lit backlight, an LED substrate with light emitting diodes (LEDs), serving as light sources, linearly mounted thereon is disposed to face a side surface of a light guide plate. The light emitted from the LEDs enters from the side surface of the light guide plate to reach dots on the back surface of the light guide plate, so that the light is emitted from the surface facing the liquid crystal panel.

In a conventional edge-lit backlight, a different configuration may be added to the above main configuration or the main configuration may be partly changed. For example, Patent Literature 1 discloses a configuration including a reflection member that reflects light from LEDs to guide the light to a light incident surface of a light guide plate and contains a fluorescent material which is excited by light emission from the LEDs to become fluorescent to change the wavelength. According to Patent Literature 2, a light guiding member having a light diffusion part is provided in order to prevent unevenness of planar light from a light emitting surface of a light guide plate, and the light diffused by this light guide member is incident on the light guide plate.

Moreover, Patent Literature 3 discloses a planar light source device in which a light guide plate is used as in an edge-lit backlight but a light source is not disposed lateral to the light guide plate. This planar light source device includes a first light guide plate for emitting incident light from one main surface, multicolor LEDs disposed on the back surface of the first light guide plate, and multiple second light guide plates for performing color mixing of colored light rays emitted from the multicolor LEDs and guiding the resulting light to be incident on the first light guide plate.

CITATION LIST

Patent Literature

Patent Literature 1: JP 2007-207615 A
Patent Literature 2: JP 2012-128958 A
Patent Literature 3: JP 2006-156039 A

SUMMARY OF INVENTION

Technical Problem

Recently, thinner display devices have been developed. From the standpoint of better design and diversification of applications, display devices have been desired to have a narrower frame. In the case of liquid crystal display devices, not only a liquid crystal panel but also a lighting device is desired to have a narrower frame.

However, since conventional edge-lit backlights as disclosed in Patent Literatures 1 and 2 need to have a space for disposing a light source lateral to a light guide plate, there is a limit on narrowing the frame.

In the case of using a point light source (e.g., light emitting diodes (LEDs)) as the light source, a narrower frame may increase the luminance at an upper part of a light guide plate at or near the front of the point light source compared to the luminance at another part, possibly resulting in reduction of the display quality of the display device. Light emitted from LEDs commonly has a highest luminosity in the normal direction to the light emitting surface. In the case where the light enters the light guide plate from an air layer, the light incident angle tends to be narrowed due to a difference in the refractive index between the air layer and the light guide plate, resulting in collection of light at or near the front of the point light source. Accordingly, if the light guide plate and the point light source are excessively close to each other, the light from the point light source may be incident on the light guide plate without being sufficiently dispersed, generating a bright point on the light guide plate at a portion near the point light source.

Moreover, in liquid crystal display devices in which a polarizing plate is mounted on each surface of a liquid crystal panel, the polarizing plate on the back surface of the liquid crystal panel absorbs half of the light emitted from the light source, problematically lowering the light use efficiency.

The present invention has been made in view of the above current state of the art, and aims to provide a lighting device that is excellent in luminance uniformity and light use efficiency and allows for a narrower frame, and a display device including the lighting device.

Solution to Problem

As a result of intensive studies to solve the above problems, the present inventors have found out that a particular configuration of a lighting device allows for a narrower frame without lowering the luminance uniformity. Specifically, in the particular configuration, a light source is disposed posterior to a light guide plate and a reflection member is disposed lateral to the light guide plate and the light source, which allows the light emitted from the light source to be reflected on a reflective surface of the reflection member and then incident on the side surface (light incident surface) of the light guide plate. In addition, the present inventors have found out that a reflective polarizing layer provided on the light incident surface of the light guide plate contributes to improvement of the light use efficiency. Thus, the present invention was completed.

Specifically, one aspect of the present invention is a lighting device including: a light guide plate; a light source disposed posterior to the light guide plate; a reflection member including a reflective surface facing a light emitting surface of the light source and a light incident surface of the light guide plate, disposed lateral to the light guide plate and the light source, the lighting device further comprising a reflective polarizing layer on the light incident surface of the light guide plate.

Another aspect of the present invention is a display device including the lighting device.

Advantageous Effects of Invention

The present invention can provide a lighting device that is excellent in luminance uniformity and light use efficiency and allows for a narrower frame, and a display device.

BRIEF DESCRIPTION OF DRAWINGS

FIG. 2(a) illustrates a case where P waves are incident on a reflective polarizing layer and FIG. 2(b) illustrates a case where S waves are incident on the reflective polarizing layer.

DESCRIPTION OF EMBODIMENTS

Hereinafter, embodiments of the lighting device and the display device according to the present invention are described. The embodiments, however, are not intended to limit the scope of the present invention.

Embodiment 1

Figure 1:
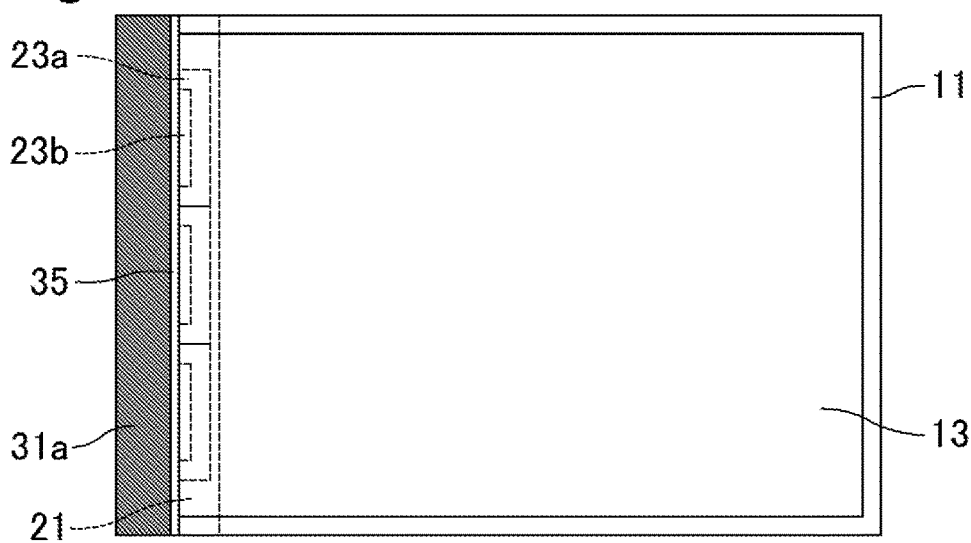
FIG. 1 is a schematic top view of a lighting device according to Embodiment 1.
Figure 2:
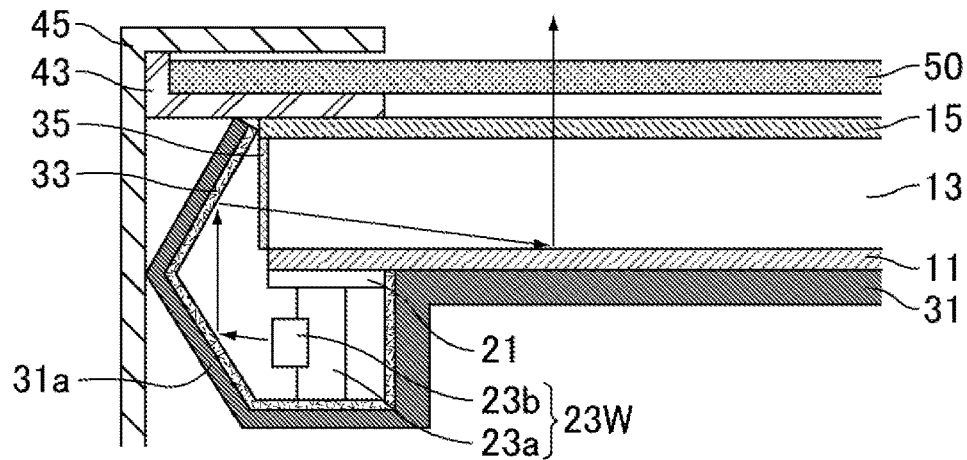
FIG. 2 includes schematic views illustrating a cross-sectional structure of a display device including the lighting device according to Embodiment 1.
Figure 2:
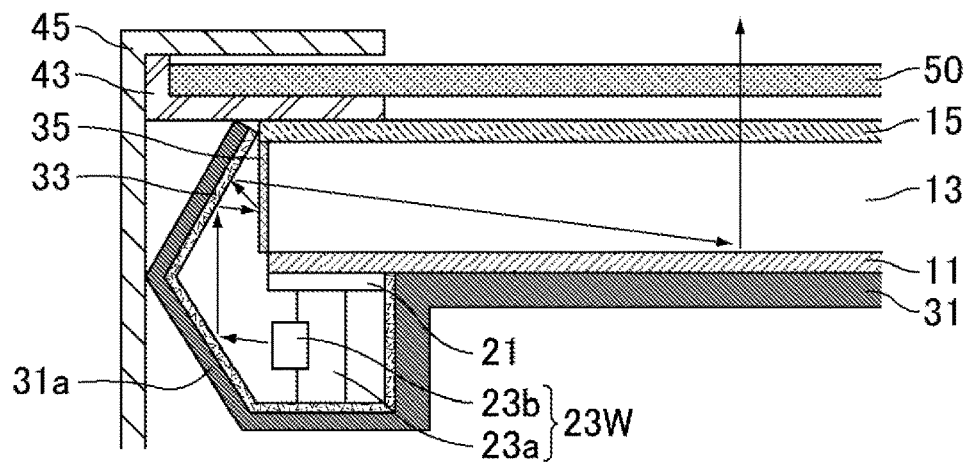
Figure 3:
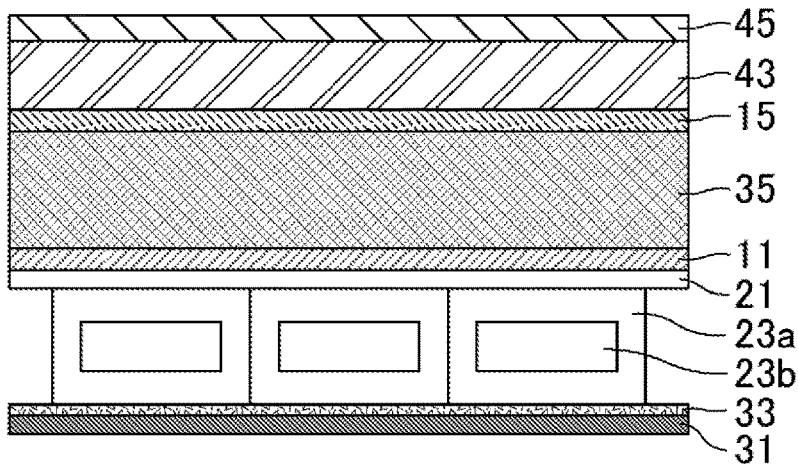
FIG. 3 is a schematic view illustrating a cross-sectional structure of the display device of FIG. 2 in a front view of a light incident surface of a light guide plate.

With reference to FIGS. 1 to 3, the configurations of a lighting device and a display device according to Embodiment 1 are described. FIG. 1 is a schematic top view of a lighting device according to Embodiment 1. FIG. 2 includes schematic views illustrating a cross-sectional structure of a display device including the lighting device according to Embodiment 1. FIG. 2(a) illustrates a case where P waves are incident on a reflective polarizing layer and FIG. 2(b) illustrates a case where S waves are incident on the reflective polarizing layer. FIG. 3 is a schematic view illustrating a cross-sectional structure of the display device of FIG. 2 in a front view of a light incident surface of a light guide plate.

The lighting device according to Embodiment 1 is an edge-lit backlight in which light emitted from a light source is incident on a light incident surface that is one side surface (end surface) of a light guide plate. In the present embodiment, on a surface of a backlight chassis 31 forming a back surface of the lighting device are stacked a reflection sheet 11, a light guide plate 13, and an optical sheet 15, and a white light emitting diode 23W serving as a light source is disposed posterior to the light guide plate 13. The backlight chassis 31 has an end portion 31a arranged to surround a lateral side of the light guide plate 13 and the white light emitting diode 23W. The end portion 31a serves as a reflection member reflecting light emitted from the white LED 23W. Hereafter, the "end portion of a backlight chassis" is also referred to as a "reflector". In addition, "light emitting diode" as used herein is also abbreviated as "LED". The terms related to the position and direction including "side surface", "back surface", "posterior", and "lateral side" are on the basis of a relative relation where a light emitting surface of the light guide plate 13 is defined as the front surface.

With the reflector 31a disposed lateral to the light guide plate 13 and the white LED 23W, the light emitted from the white LED 23W is configured to be incident on the side surface of the light guide plate 13. In other words, the light emitting surface of the white LED 23W faces a reflective surface of the reflector 31a, and the light emitted from the white LED 23W is reflected on the reflector 31a to be incident on the side surface of the light guide plate 13. In FIGS. 2(a) and 2(b), the path of the light emitted from the white LED 23W is illustrated by arrows. In contrast, the light emitted from the white LED 23W is not directly incident on the back surface of the light guide plate 13 because the light emitting surface of the white LED 23W is parallel to the side surface of the light guide plate 13.

The light guide plate 13 is a member reflecting, on the lower surface, the light entering from the side surface and emitting the reflected light from the upper surface as planar light. It may be a member conventionally known in the field of edge-lit backlights. Below the light guide plate 13 is disposed a reflection sheet 11 which prevents leakage of light to the back side of the light guide plate 13. The reflection sheet 11 is not particularly limited as long as it is a member including a reflective surface as a surface facing the light guide plate 13, and may be integrated with the light guide plate 13. Above the light guide plate 13 is disposed the optical sheet 15. The type of the optical sheet 15 is not particularly limited, and may be one conventionally known in the field of edge-lit backlights such as a diffusion film or a luminance-enhancing film.

The white LED 23W is a light emitting diode emitting white light. In the present embodiment, multiple white LEDs 23W are disposed on a mounting surface of an LED substrate 21. The back surface of the LED substrate 21 is fixed to the back surface of the light guide plate 13 with the reflection sheet 11 interposed therebetween. The LED substrate 21 is preferably an insulating substrate provided with a line electrically connected to the white LED 23W. The white LED 23W has a light emitting part 23b forming the light emitting surface, and a supporting part 23a that supports the light emitting part 23b and is used for mounting to the LED substrate 21. The light emitting surface of the white LED 23W mounted on the LED substrate 21 is perpendicular to the mounting surface and emits light laterally to the reflector 31a side. Alternatively, a side surface of the mounting surface of the LED substrate 21 may be fixed to the back surface of the reflection sheet 11 or, in the case where the backlight chassis 31 entirely covers the lower surface of the reflection sheet 11, to the back surface of the backlight chassis 31, so that the white LED 23W has a light emitting surface parallel to the mounting surface. As illustrated in FIG. 3, multiple chips of the white LEDs 23W are arranged in a row on the LED substrate 21. Multiple white LEDs 23W are preferably arranged in a row to form a line light source as a whole.

The reflector 31a is a bended plate-like member having a tilt surface not in parallel to the light emitting surface of the white LED 23W and to the side surface (light incident surface) of the light guide plate 13. More specifically, the reflector 31a has a concave portion on the side of the white LED 23W and the light guide plate 13. With this concave portion, the light emitted from the white LED 23W can be incident on the side surface of the light guide plate 13. The reflector 31a is preferably a high reflection member. It may be a member formed of a material showing high reflectance such as a metal or a member including a resin plate or the like and a high reflectance film formed thereon. Examples of the material of the reflector 31a include metals such as silver, aluminum, iron, and copper and resins such as PMMA, PS, PC, ABS, and PET. Examples of the coating formed on the material surface include a silver deposition film, a silver plating layer, a nickel plating layer, and a white coating film (white ink layer). The reflector 31a may be a member integrated with another member such as the backlight chassis 31 or a member independent of other members.

The reflector 31a reflects the light emitted from the white LED 23W on the reflective surface to change the travel direction of the light, and it is not a member containing a fluorescent material or the like for once absorbing the light emitted from the white LED 23W and emitting the light of a different wavelength.

The reflector 31a has a scattering layer 33 (also referred to as a diffusion layer) on the reflective surface. The scattering layer 33 is not particularly limited as long as it scatters the transmitted light, and may be, for example, a layer of a transparent resin in which particles (or air bubbles) having a refractive index different from that of the transparent resin are dispersed. Specific examples thereof include: a microporous layer formed by applying a material that has a foaming effect to generate fine bubbles, to the surface of the reflector 31a; and a bead-containing resin layer formed by applying a mixture containing a binder and light scattering beads, to the surface of the reflector 31a. Examples of the material of the beads include acrylic resins and polycarbonate. The shape of the beads is, for example, a spherical shape and the size of the beads is, for example, about $\Phi 1$ to $\Phi 50$ μm in diameter.

The light guide plate 13 has a reflective polarizing layer 35 on the light incident surface. The reflective polarizing layer 35 reflects S waves and transmits P waves. The liquid crystal panel 50 transmits P waves and does not transmit S waves. The P waves passing through the reflective polarizing layer 35 are incident on the liquid crystal panel 50 as P waves to pass through the liquid crystal panel 50. Accordingly, among components of light emitted from the white LED 23W, components that become P-waves upon incidence on the liquid crystal panel 50 pass through the reflective polarizing layer 35 and components that become S-waves upon incidence on the liquid crystal panel 50 are reflected by the reflective polarizing layer 35. The light reflected by the reflective polarizing layer 35 is scattered by the scattering layer 33 or re-reflected by the reflector 31a so that the polarization is disturbed, and is partly converted to P-waves that can pass through the reflective polarizing layer 35 and the liquid crystal panel 50. In other words, the light converted to P-waves by the scattering layer 33 passes through the reflective polarizing layer 35 and is incident on the light guide plate 13, resulting in better light use efficiency and higher luminance.

The reflective polarizing layer 35 is not particularly limited, and examples thereof include a multilayer reflection-type polarizing plate (product name: DBEF) available from 3M Japan Limited and a reflection type polarizing plate including a cholesteric liquid crystal film and a λ/4 plate fixed to the viewer side surface of the cholesteric liquid crystal film. Preferably, the reflective polarizing layer 35 has a reflection axis in the thickness direction of the light guide plate 13 (longitudinal-axis short-side direction of the light incident surface) and a transmission axis in the width direction of the light guide plate 13 (horizontal-axis long-side direction of the light incident surface).

The display device according to Embodiment 1 is a liquid crystal display device. As illustrated in FIG. 2, a liquid crystal panel 50 is disposed above the lighting device according to Embodiment 1. The liquid crystal panel 50 controls the transmission amount of light emitted from the lighting device in accordance with input image signals. To the front and back surfaces of the liquid crystal panel 50 is attached a pair of absorption-type polarizing plates (not illustrated). The liquid crystal panel 50 is held by the plastic chassis 43 and a bezel 45.

As described above, in the lighting device according to Embodiment 1, the white LED 23W and the LED substrate 21 are disposed posterior to the light guide plate 13, not facing the side surface of the light guide plate 13, and the reflector 31a and the scattering layer 33 are provided. This configuration allows scattering and reflection of LED light, leading to entrance of light to the light guide plate 13. This suppresses generation of LED bright points on the light-emitting surface of the light guide plate, enabling narrowing of the frame and enhancement of luminance uniformity. To the light incident surface of the light guide plate 13 is attached the reflective polarizing layer 35 that allows the polarized component (P-waves) which can pass through the liquid crystal panel 50 to pass therethrough and reflects the other polarized components (S waves). The reflected light is scattered and re-reflected to enter the light guide plate 13. This enhances the light use efficiency and improves the luminance.

Accordingly, a display device including the lighting device according to Embodiment 1 can have a narrower frame and achieve high display quality.

Figure 4:
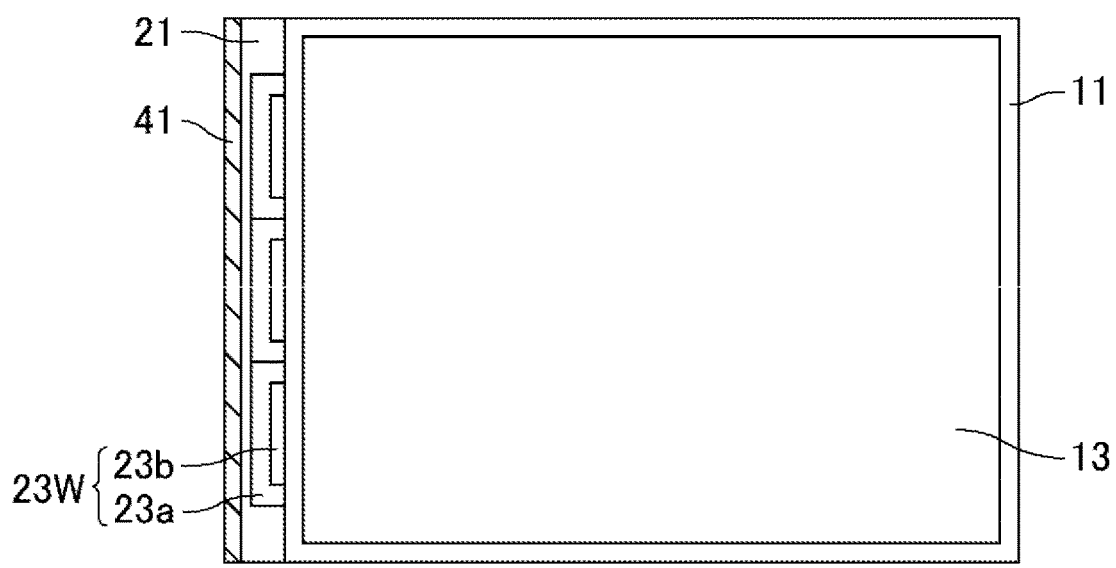
FIG. 4 is a schematic top view of a lighting device according to Comparative Embodiment.
Figure 5:
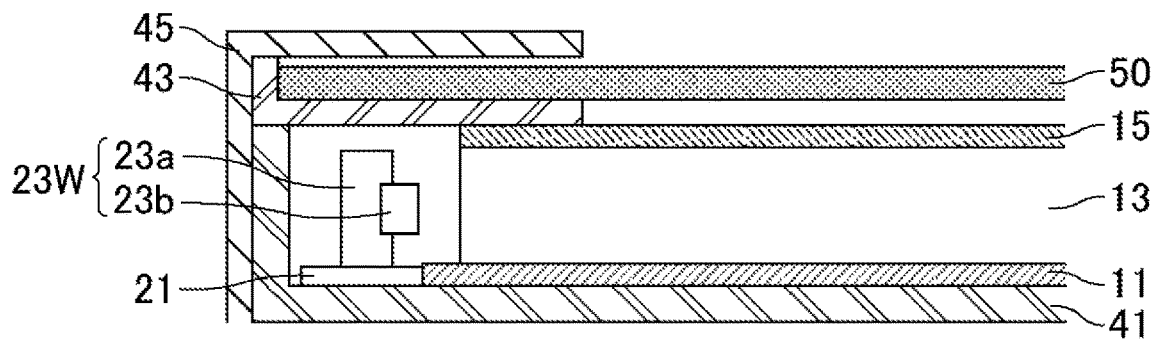
FIG. 5 is a schematic view illustrating a cross-sectional structure of a display device including the lighting device according to Comparative Embodiment.
Figure 6:
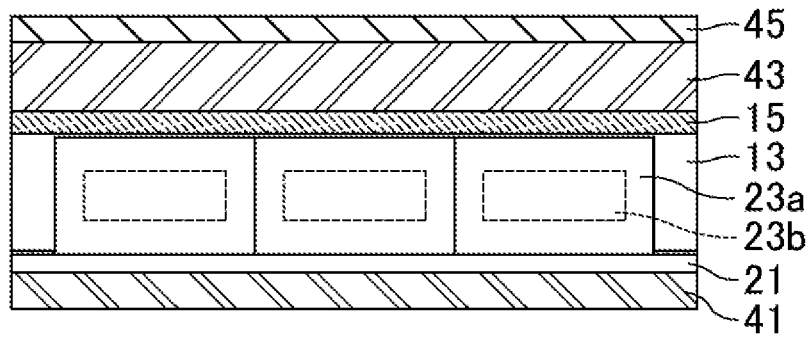
FIG. 6 is a schematic view illustrating a cross-sectional structure of the display device of FIG. 5 in a front view of a light incident surface of a light guide plate.

Advantages of the lighting device according to Embodiment 1 are more specifically described in the following with reference to drawings. First, the configuration of a lighting device according to Comparative Embodiment is described with reference to FIGS. 4 to 6 for comparison with the lighting device according to Embodiment 1. FIG. 4 is a schematic top view of a lighting device according to Comparative Embodiment. FIG. 5 is a schematic view illustrating a cross-sectional structure of a display device including the lighting device according to Comparative Embodiment. FIG. 6 is a schematic view illustrating a cross-sectional structure of the display device of FIG. 5 in a front view of a light incident surface of a light guide plate. As illustrated in FIG. 5, in Comparative Embodiment, the white LED 23W as a light source is disposed lateral to the light guide plate 13 and the light emitting surface of the white LED 23W faces the side surface (light incident surface) of the light guide plate 13. In other words, the light emitted from the white LED 23W is directly incident on the side surface of the light guide plate 13.

The lighting device according to Embodiment 1 has the following advantages, compared to the lighting device according to Comparative Embodiment.

(1) Narrower Frame

Figure 7:
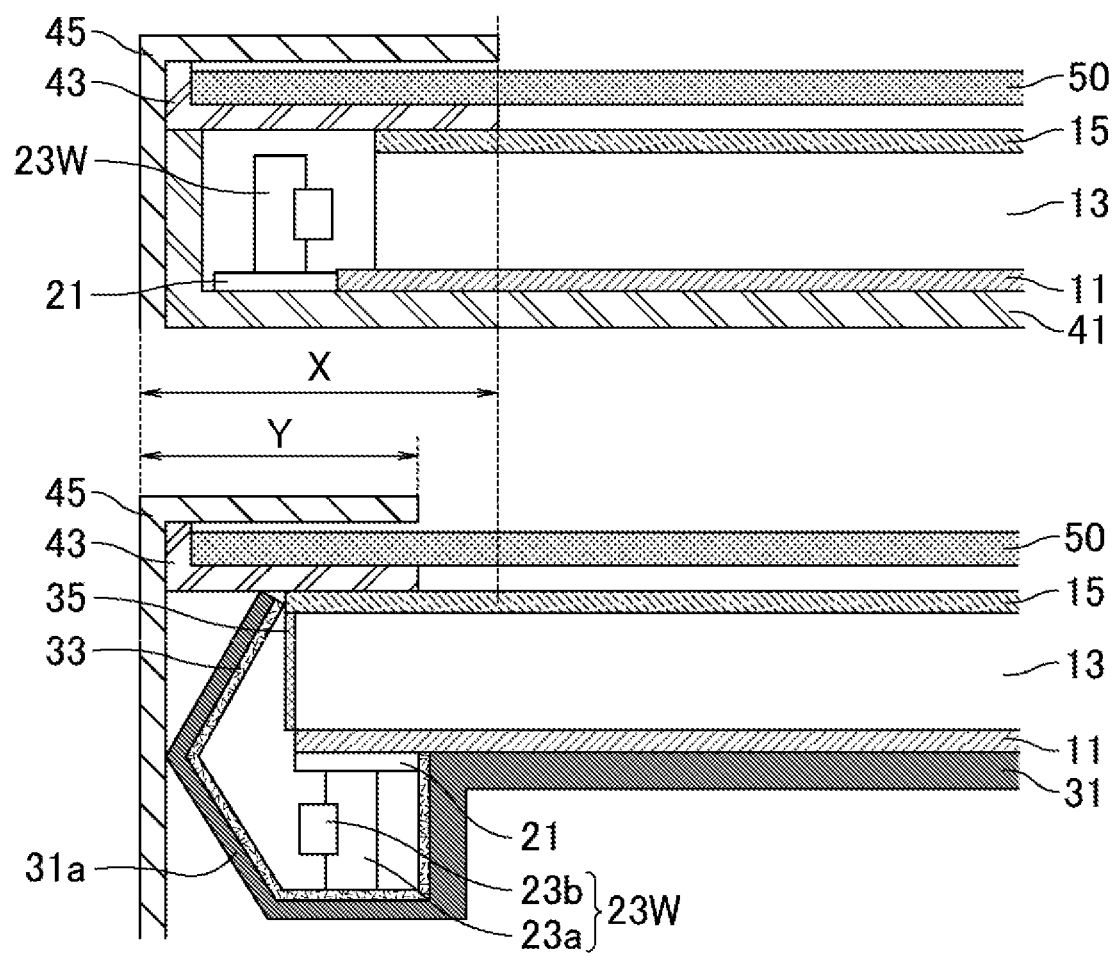
FIG. 7 is a view comparing the length of the frame on the light incident side of the light guide plate in the lighting device according to Embodiment 1 and the lighting device according to Comparative Embodiment.

FIG. 7 is a view comparing the length of the frame on the light incident side of the light guide plate in the lighting device according to Embodiment 1 and the lighting device according to Comparative Embodiment. As illustrated in FIG. 7, the width Y of the bezel 45 on the light incident side of the light guide plate in Embodiment 1 is shorter than the width X of the bezel 45 on the light incident side of the light guide plate in Comparative Embodiment (X>Y). Here, the reflector 31a is disposed lateral to the light guide plate 13 so that the LED substrate 21 is disposed posterior to the light guide plate 13 in Embodiment 1, and the LED substrate 21 is disposed lateral to the light guide plate 13 in Comparative Embodiment. If the width X of the bezel 45 in Comparative Embodiment is shortened to the width Y of the bezel 45 in Embodiment 1, the LED substrate 21 or the white LED 23W need to be downsized. In addition, as described later in (2), the shortened optical path between the white LED 23W and the light guide plate 13 may cause luminance unevenness. Specifically, in the lighting device according to Embodiment 1 compared to the lighting device according to Comparative Embodiment, the area in which the white LED 23W and the LED substrate 21 are disposed can be reduced on the side where the white LED 23W is disposed, which advantageously allows for a narrower frame.

(2) Improvement of Luminance Uniformity

Figure 8:
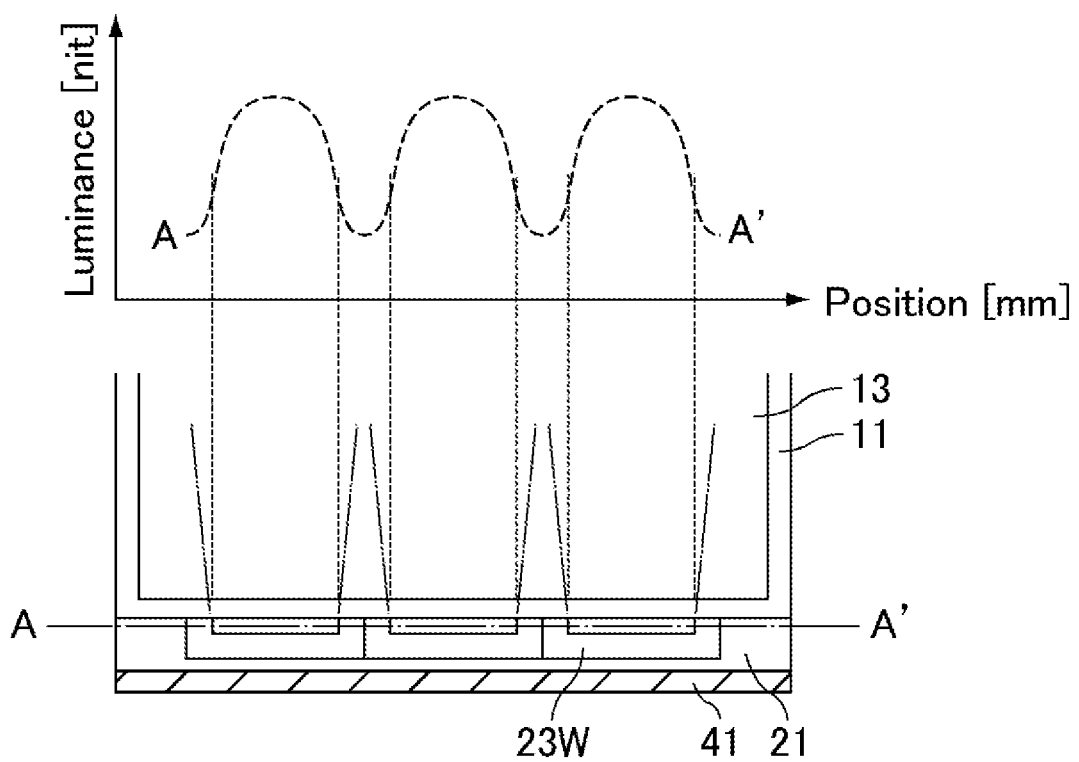
FIG. 8 is a graph showing the luminance distribution at a light incident part of the light guide plate in the lighting device according to Comparative Embodiment.
Figure 9:
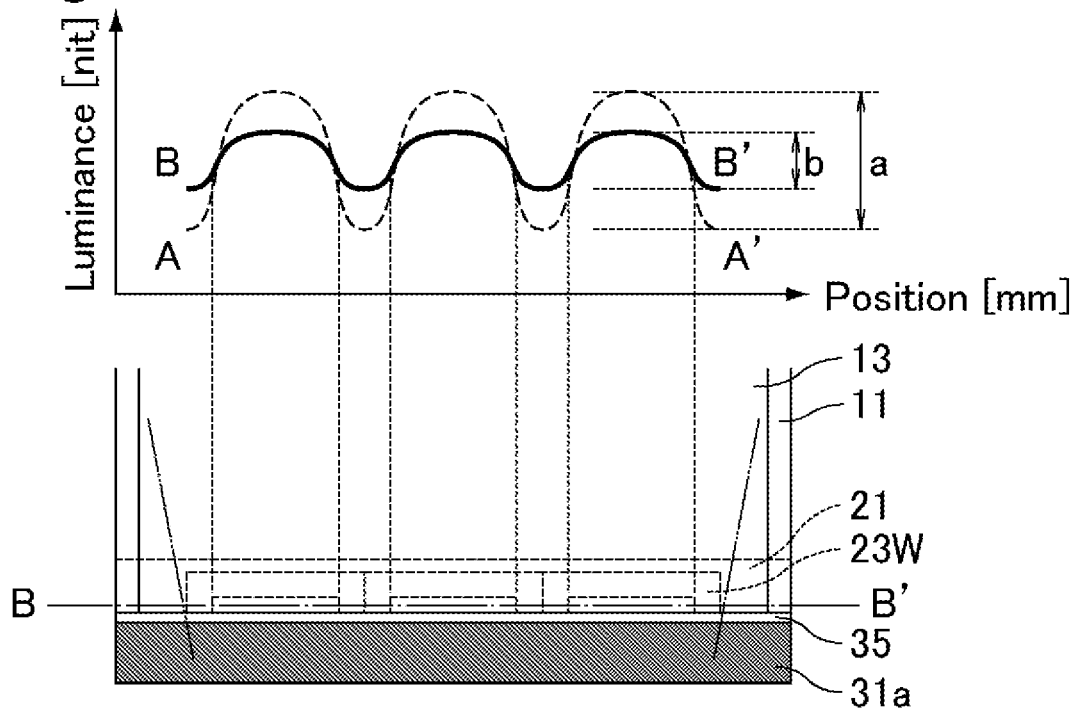
FIG. 9 is a graph showing the luminance distribution at a light incident part of the light guide plate in the lighting device according to Embodiment 1.

FIG. 8 is a graph showing the luminance distribution at a light incident part of the light guide plate in the lighting device according to Comparative Embodiment. FIG. 9 is a graph showing the luminance distribution at a light incident part of the light guide plate in the lighting device according to Embodiment 1. As seen in the comparison between FIG. 8 and FIG. 9, the variation b in the luminance at the light incident part of the light guide plate in Embodiment 1 is smaller than the variation a in the luminance at the light incident part of the light guide plate in Comparative Embodiment (a>b). This is because, in Embodiment 1, the optical path between the white LED 23W and the light guide plate 13 is longer than the optical path in Comparative Embodiment in spite of the narrower frame and the scattering layer 33 is provided. Specifically, the luminance uniformity at the light incident part of the light guide plate can be higher in Embodiment 1 than in Comparative Embodiment. The effect of enhancing the luminance uniformity is greater in the case where a point light source (e.g., LEDs) is used than in the case where a line light source (e.g., cold-cathode tubes) is used as a light source.

(3) Improvement of Luminance

In Embodiment 1, the reflective polarizing layer 35 is provided on the light incident surface of the light guide plate 13 and the scattering layer 33 is provided on the surface of the reflector 31a. With this configuration, not only the polarized components (first P waves) passing through the reflective polarizing layer 35 but also polarized components (second P waves) resulting from conversion of the polarized components (S waves) reflected on the surface of the reflective polarizing layer 35 to P waves by re-reflection on the reflector 31a or scattering by the scattering layer 33 can enter the light guide plate 13. As a result, the amount of the polarized components (P waves) passing through the liquid crystal panel 50 contained in the light entering the light guide plate 13 can be increased to improve the luminance of the liquid crystal panel 50.

In contrast, in the case of Comparative Embodiment, the light entering the light guide plate 13 equally contains P waves and S waves and, after emission from the light guide plate 13, P waves can pass through the liquid crystal panel 50 while S waves are absorbed by the absorption-type polarizing plate on the back surface of the liquid crystal panel 50, resulting in loss of light.

Embodiment 2

Figure 10:
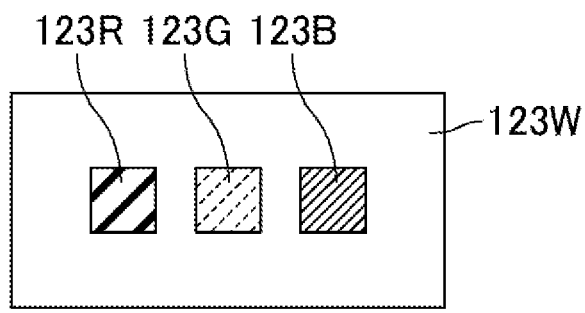
FIG. 10 is a front view of RGB-LEDs used in Embodiment 2.
Figure 11:
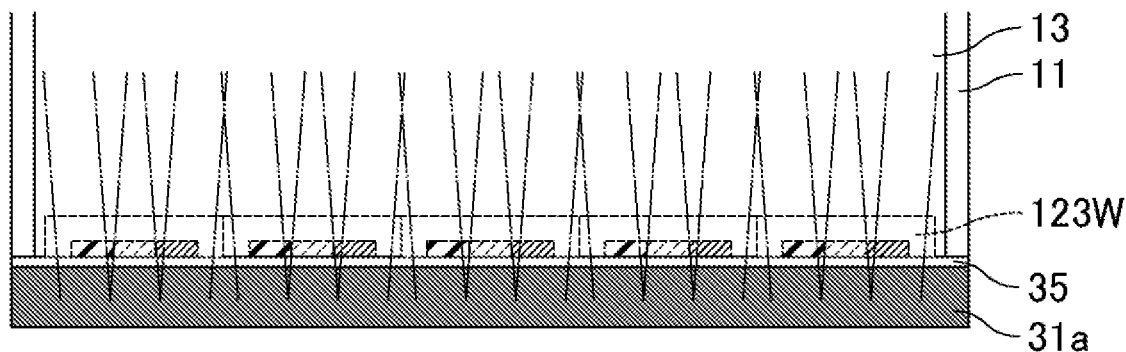
FIG. 11 is a top view of a lighting device according to Embodiment 2 in which color mixing of light rays from RGB-LEDs is performed in a light guide plate.

The configuration of Embodiment 2 is the same as that of Embodiment 1, except that, as multiple light sources mounted on the LED substrate, 3-in-1 RGB-LEDs including chips of a red LED, a green LED, and a blue LED in one package are used instead of white LED chips. FIG. 10 is a front view of RGB-LEDs used in Embodiment 2. In Embodiment 2, red light emitted from a red LED 123R, green light emitted from a green LED 123G, and blue light emitted from a blue LED 123B are subjected to color mixing in the light guide plate 13, thereby obtaining white light from a RGB-LED 123W. FIG. 11 is a top view of a lighting device according to Embodiment 2 in which color mixing of lights from RGB-LEDs is performed in a light guide plate.

Figure 12:
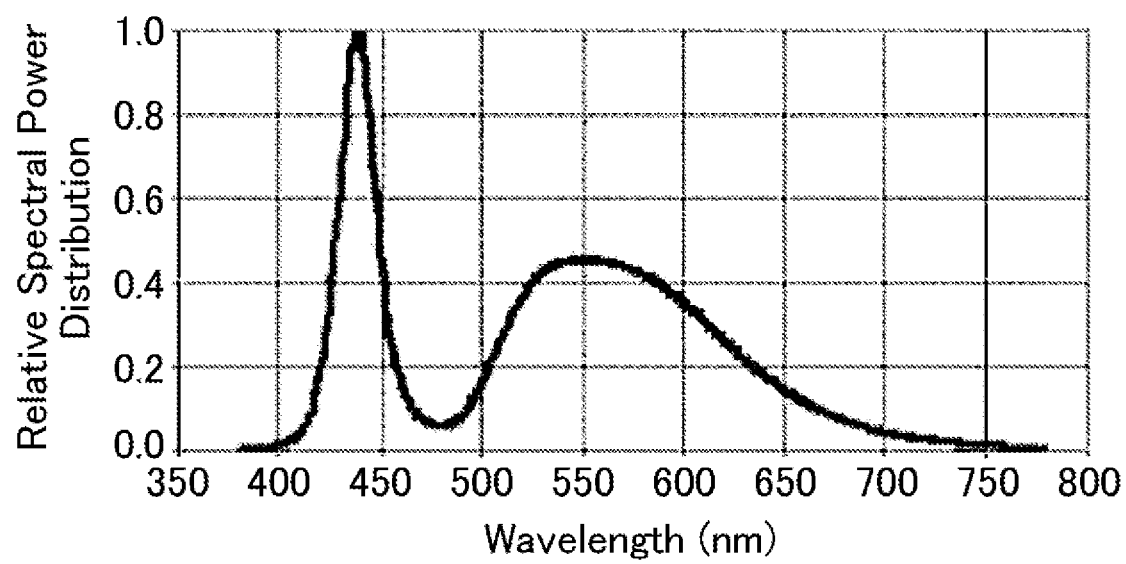
FIG. 12 shows an exemplary emission spectrum of a white LED.
Figure 13:
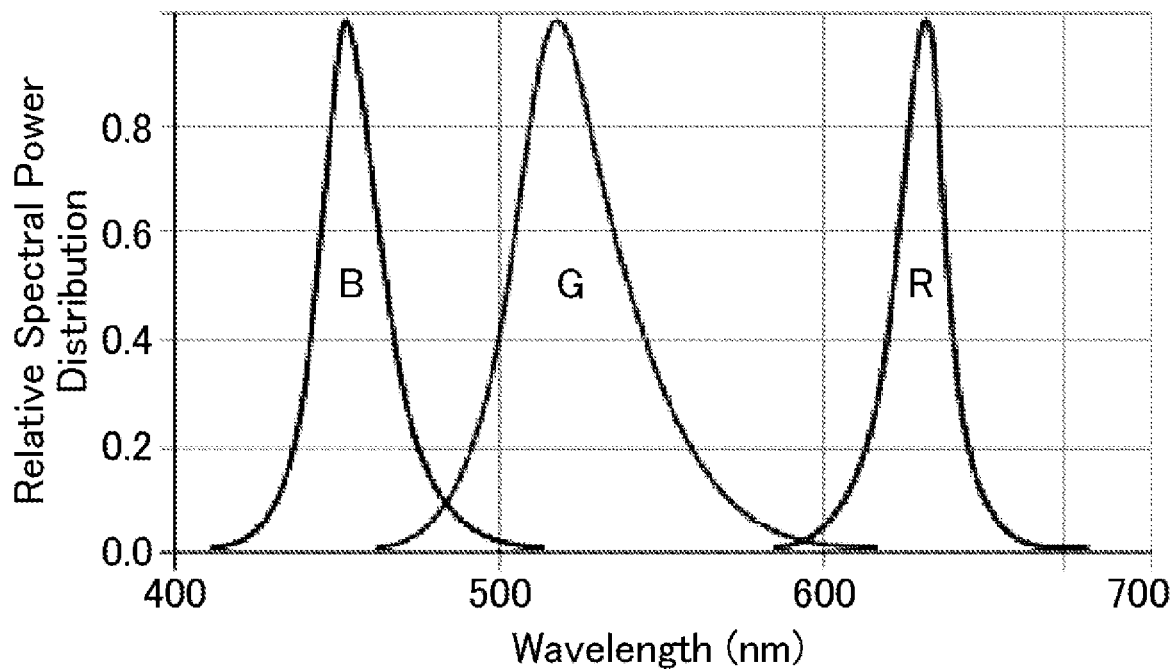
FIG. 13 shows exemplary emission spectra of RGB-LEDs.

FIG. 12 shows an exemplary emission spectrum of a white LED. FIG. 13 shows exemplary emission spectra of RGB-LEDs. As seen in comparison between FIG. 12 and FIG. 13, light emission with higher color reproducibility (color rendering) can be achieved in Embodiment 2 in which RGB-LEDs are used than in Embodiment 1.

Embodiment 3

Figure 14:
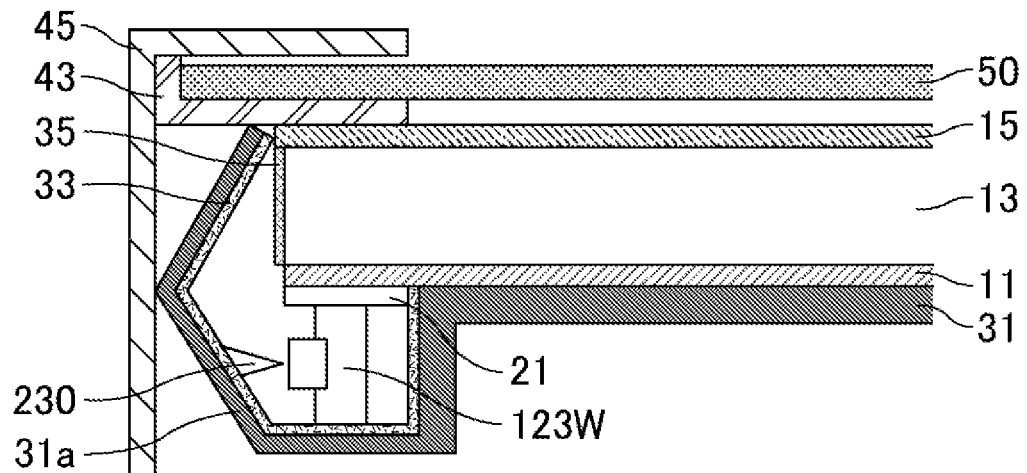
FIG. 14 is a schematic view illustrating a cross-sectional structure of a display device including a lighting device according to Embodiment 3.
Figure 15:
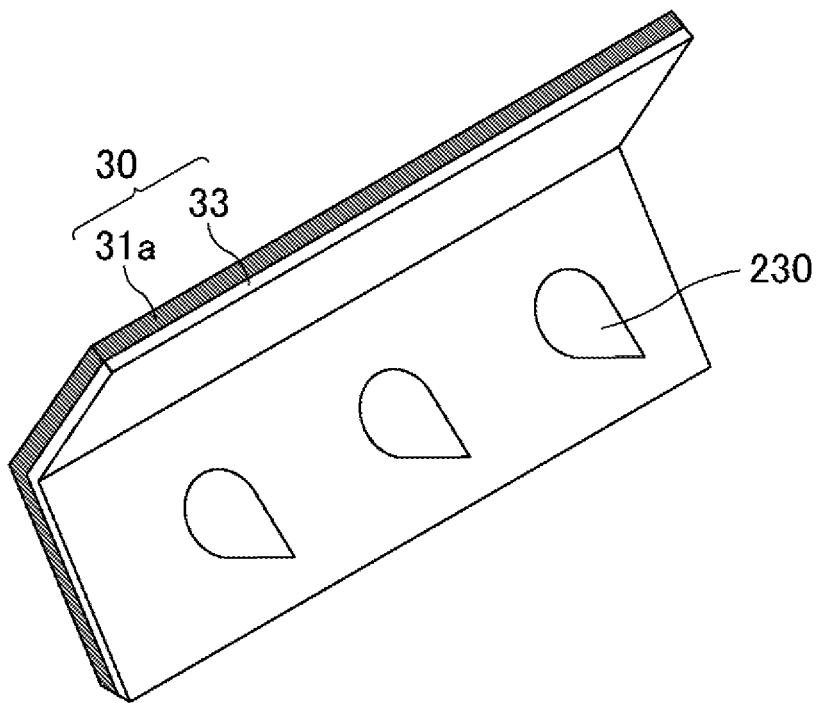
FIG. 15 is a schematic perspective view of a conical lens provided in a reflector with a scattering layer of Embodiment 3.

In Embodiment 3, a conical lens is disposed on a reflector at a position facing each of the emission centers of the red LED, green LED, and blue LED. The configuration other than this is the same as that of Embodiment 2. FIG. 14 is a schematic view illustrating a cross-sectional structure of a display device including a lighting device according to Embodiment 3. FIG. 15 is a schematic perspective view of a conical lens provided in a reflector with a scattering layer of Embodiment 3. As illustrated in FIG. 14 and FIG. 15, each conical lens 230 is provided on the reflector 30 with a scattering layer on the side of the light guide plate 13 and the RGB-LED 123W, and the bottom face thereof is in contact with the scattering layer 33 and the tip thereof faces the emission center.

Figure 16:
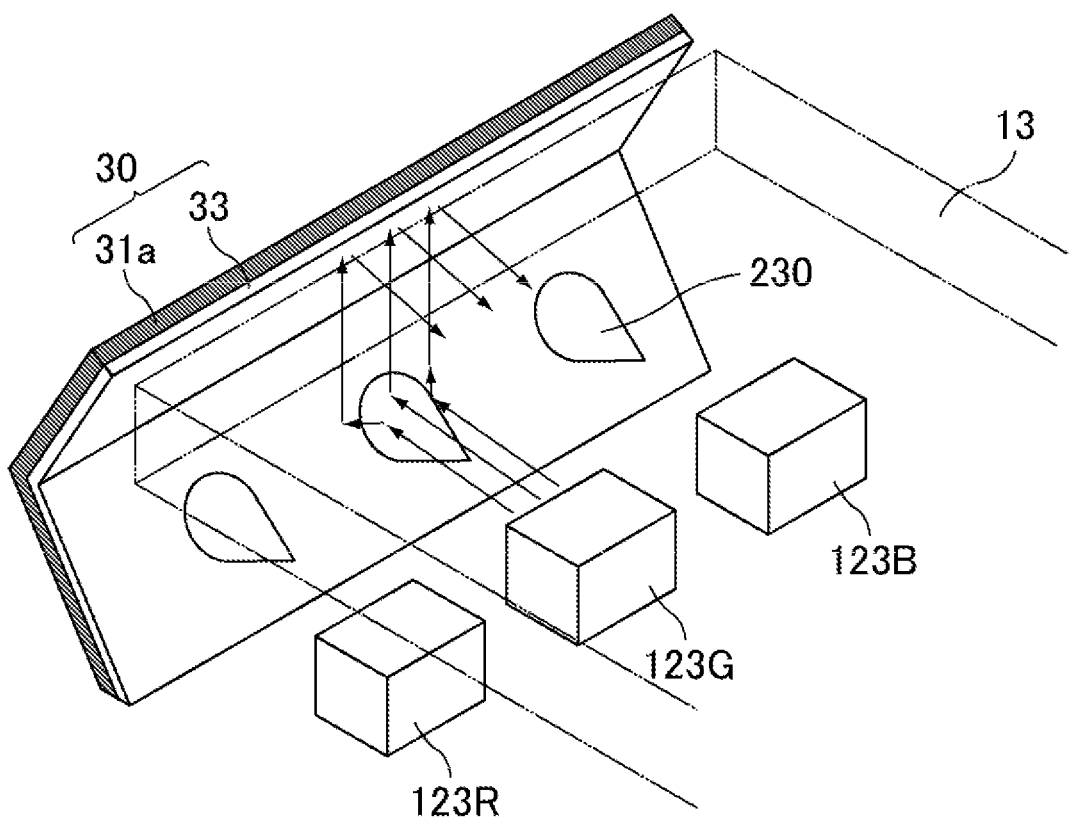
FIG. 16 is a perspective view for explaining the optical path between a light source and a light guide plate in Embodiment 3.
Figure 17:
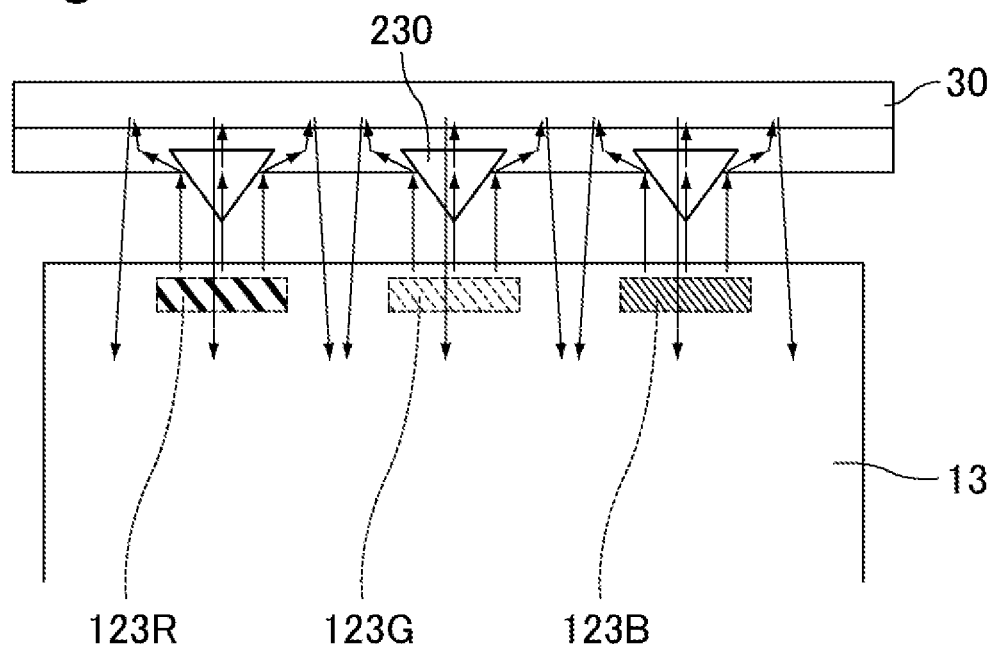
FIG. 17 is a top-down view for explaining the optical path between the light source and the light guide plate in Embodiment 3.

FIG. 16 is a perspective view for explaining the optical path between a light source and a light guide plate in Embodiment 3. FIG. 17 is a top-down view for explaining the optical path between the light source and the light guide plate in Embodiment 3. As illustrated in FIG. 16 and FIG. 17, the conical lens 230 is preferably disposed to face the emission center of the LED of each color, i.e., along the optical axis of the LED of each color. The LED light ray emitted from the LED of each color is reflected on the conical lens 230, enters the reflector 30 with a scattering layer to be scattered and reflected by the reflector 30 with a scattering layer, and then enters the light guide plate 13. As illustrated in FIG. 16 and FIG. 17, the light incident on the front surface of the conical lens 230, light incident on the right side surface of the conical lens 230, and light incident on the left side surface of the conical lens 230 are respectively reflected in different directions by the conical lens 230 and then reflected on the lower part (conical lens 230 mounting surface) and the upper part (surface facing the light guide plate 13) of the reflector 30 with a scattering layer, and they enter the light guide plate 13. Part of the LED light rays emitted from the LED of each color may pass through the conical lens 230, be reflected on the reflector 30 with a scattering layer, and enter the light guide plate 13. Alternatively, it may be reflected by the conical lens 230 and then directly enter the light guide plate 13.

As described above, the conical lens 230 has a function of widely scattering and reflecting the light emitted from the facing LED of each color to widen the light-distributing range of the LED light rays having high directionality (straightness). In other words, providing the conical lens 230 allows uniform entry of the LED light rays to the light incident surface of the light guide plate 13, improving the luminance uniformity at the light incident part of the light guide plate and the RGB color mixing properties.

Figure 18:
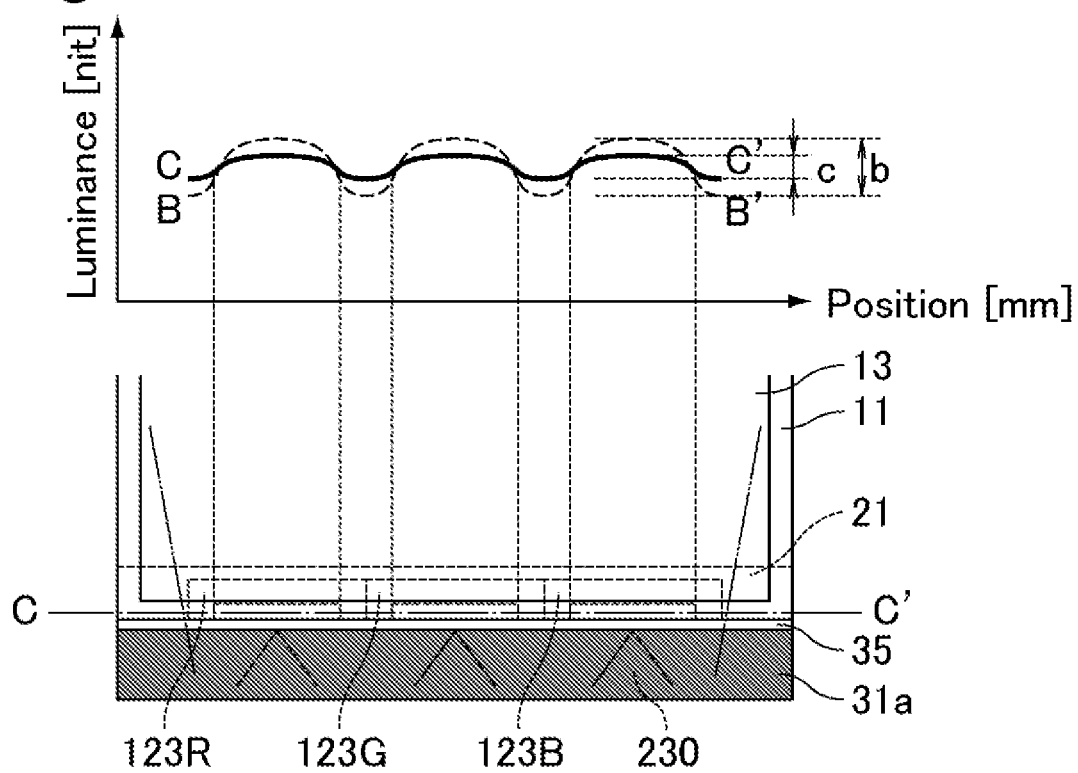
FIG. 18 is a graph showing the luminance distribution at a light incident part of a light guide plate in the lighting device according to Embodiment 3.

FIG. 18 is a graph showing the luminance distribution at a light incident part of a light guide plate in the lighting device according to Embodiment 3. As seen in FIG. 18, the luminance right above the LED of each color is lowered to equalize the luminance distribution on the light incident surface of the light guide plate 13 (b>c). Specifically, according to Embodiment 3 in which the conical lens 230 is used, the luminance uniformity is further improved than in Embodiment 2. Moreover, according to Embodiment 3, red light emitted from the red LED 123R, green light emitted from the green LED 123G, and blue light emitted from the blue LED 123B can be subjected to more sufficient and uniform color mixing than in Embodiment 2.

From the standpoint of uniformly widening in every direction the light distribution angle of the LED light rays having directionality symmetrical to the emission center in the vertical and horizontal directions, the conical lens 230 has a conical shape. It may have a truncated cone shape depending on the light distribution properties of the LED light source. A preferred shape of the conical lens 230 is determined according to the light distribution angle of the LED light source. Specifically, in the case where the LED light source has a wide light distribution angle, the conical lens preferably has a wide apex angle. In the case where the LED light source has a narrow light distribution angle, the conical lens preferably has a sharp apex angle. In addition, the conical lens 230 may have a surface subjected to silver plating or white coating having a high reflectance with an aim of enhancing the effect of widening the light distribution of the LED light source.

Variation Example

The type of the light source provided to the lighting device is not particularly limited, and a different type of light source such as a cold-cathode tube may be used instead of the white LED in Embodiment 1 and the RGB-LED in Embodiments 2 and 3. Since an LED emits light having high straightness, in the case where an LED is used as a light source, the effect of improving the luminance uniformity achieved by employing the configuration of the present invention is more significant.

In Embodiments 1 to 3, the reflector 31a is used as a reflection member. In the present invention, the reflection member is not particularly limited as long as it reflects the light emitted from the light source to allow the light to be incident on the side surface of the light guide plate. The reflection member may have a shape other than the planar shape. Moreover, two or more reflection members may be provided in order to reflect the light emitted from the light source and allow the light to be incident on the side surface of the light guide plate.

In Embodiments 1 to 3, the scattering layer 33 is provided on the reflective surface of the reflector 31a. In the present invention, the scattering layer may be provided at any part as long as it is provided at a point included in the optical path of the light from its emission from the light source to the incidence on the reflective polarizing layer. The scattering layer may be provided, for example, by a method (1) or (2) described below.

(1) The solder resist provided on the outermost surface of the LED substrate may be whitened and imparted with a scattering function, thereby forming a scattering layer. Examples of the method of forming a white solder resist include photographic development and alkali development each utilizing UV curing or IR curing. An example of a solder resist composition used in the alkali development is a composition containing: (A) a carboxyl group-containing resin; (B) a photopolymerization initiator; (C) melamine or its derivative; (D) a photopolymerizable monomer; (E) a rutile-type titanium oxide; (F) an epoxy compound; and (G) an organic solvent. The use of such a composition can prevent reduction in the reflectance caused by discoloration and enables formation of a high-resolution white solder resist having a high reflectance.

(2) A reflection sheet may be provided on the surface of the LED substrate or the surface of the reflector. Examples of the reflection sheet include a white sheet formed by generating fine air bubbles by a foaming effect in a PET material as a base. The thicker the reflection sheet is, the higher the reflectance of the reflection sheet becomes. For example, the reflection sheet used has a thickness of about 0.1 mm to 1 mm. Alternatively, the reflection sheet may be a PET sheet coated with a layer containing light-scattering beads. The material of the beads may be, for example, an acrylic resin or polycarbonate. The beads may have a spherical shape, for example, and may have a size of, for example, (1 to 050 μm in diameter.

Embodiments 1 to 3 each relates to a liquid crystal display device including an edge-lit backlight. However, the present invention may be applied to any type of display device, and may be suitably applied to a non-self-emitting display device in which a lighting device is used for display. Examples of the non-self-emitting display device include electrophoresis display devices, in addition to liquid crystal display devices. The lighting device of the present invention may be used for applications other than display devices, such as residential lighting fixtures, meter illumination, and signboard illumination.

In Embodiments 1 to 3, white light is obtained from white LEDs or RGB-LEDs. In the present invention, however, the color of light emitted from the lighting device is not particularly limited. In particular, for applications other than display devices, colored light is suitably used in some cases. Moreover, in generation of white light by color mixing of colored light rays, colored light rays other than a combination of red, green, and blue may be used. From above, the color of light emitted from each light source provided in the lighting device is not particularly limited and the number of light colors is not particularly limited.

[Additional Remarks]

One aspect of the present invention may be a lighting device including: a light guide plate; a light source disposed posterior to the light guide plate; a reflection member including a reflective surface facing a light emitting surface of the light source and a light incident surface of the light guide plate, disposed lateral to the light guide plate and the light source, the lighting device further including a reflective polarizing layer on the light incident surface of the light guide plate.

The lighting device may further include a scattering layer on the reflective surface of the reflection member.

The light source may include a white light emitting diode.

The light source may include multiple light emitting diodes emitting different colored light rays, and may generate white light by color mixing of the different colored light rays emitted from the multiple light emitting diodes.

The lighting device may further include a conical lens on the reflective surface of the reflection member.

Another aspect of the present invention may be a display device including the lighting device.

REFERENCE SIGNS LIST

11: Reflection sheet
13: Light guide plate
15: Optical sheet
21: LED substrate
23a: Support part
23b: Emission part
23W: White LED
30: Reflector with scattering layer
31: Backlight chassis
31a: Reflector
33: Scattering layer
35: Reflection-type polarizing layer
43: Plastic chassis
45: Bezel
50: Liquid crystal panel
123R: Red LED
123G: Green LED
123B: Blue LED
123W: RGB-LED
230: Conical lens

The invention claimed is:

1. A lighting device comprising:
a light guide plate;
a light source disposed posterior to the light guide plate;
a reflection member including a reflective surface facing a light emitting surface of the light source and a light incident surface of the light guide plate, disposed lateral to the light guide plate and the light source,
the lighting device further comprising a reflective polarizing layer on the light incident surface of the light guide plate, a scattering layer on the reflective surface of the reflection member, and a conical lens on the reflective surface of the reflection member.

2. The lighting device according to claim 1, wherein the light source includes a white light emitting diode.

3. The lighting device according to claim 1, wherein the light source includes multiple light emitting diodes emitting different colored light rays, and generates white light by color mixing of the different colored light rays emitted from the light emitting diodes.

4. A display device comprising the lighting device according to claim 1.

* * * * *